April 12, 1955     H. R. WELLS ET AL     2,706,173
APPARATUS FOR ELECTRO-PLATING CRANKSHAFT JOURNALS Filed Oct. 12, 1950     5 Sheets-Sheet 2

INVENTOR.
HAROLD R. WELLS,
BY & FRANK P. GILL

April 12, 1955 H. R. WELLS ET AL 2,706,173
APPARATUS FOR ELECTRO-PLATING CRANKSHAFT JOURNALS INVENTORS
HAROLD R. WELLS
& FRANK P. GILL,
BY
Justitute Macklin
ATTY

# United States Patent Office 2,706,173
Patented Apr. 12, 1955

2,706,173

APPARATUS FOR ELECTRO-PLATING CRANKSHAFT JOURNALS

Harold R. Wells, Rocky River, and Frank P. Gill, Cleveland, Ohio

Application October 12, 1950, Serial No. 189,734

3 Claims. (Cl. 204—212)

This invention relates to electro-plating and is essentially concerned with uniformly depositing plating metal such, for example, as chromium on predetermined restricted areas of objects or articles having compound geometrical shapes.

Further, the invention is concerned with simultaneously uniformly plating the bearing surfaces in offset relations. An illustration of an important use of my apparatus is that of simultaneously plating the main journal and crank or piston-rod journal surfaces of crankshafts.

Essential objects of the invention include effecting uniform plating of predetermined thickness on a plurality of surfaces such as the journal or bearing surfaces of a crankshaft to precise amounts of predetermined thickness of plate deposit on all of these bearing surfaces simultaneously to finished dimensions.

In the plating of journal bearings surfaces of new crankshafts with a coating of predetermined uniform thickness of material such as chromium, much longer wearing life may be attained.

Heretofore, such an operation has been expensive and requires subsequent grinding of each of the surfaces by reason of the uneven thickness of such coatings deposited by present plating methods. That is, the plate coating must be deposited with sufficient thickness so that the thinnest portion of the uneven thickness of coating is that of the required addition, and slightly more, in order that the surface may be ground to its true cylindrical contour and end radius portions, removing considerable surplus which, of course, is not only valuable material but has required additional plating time to deposit.

A particularly advantageous use of my invention is that of building up worn journal surfaces of multi-throw, i. e., multi-cylinder crankshafts.

Heretofore, worn crankshafts have been recovered or salvaged for new life of wear by insulating the surfaces of such crankshafts, and then immersing the crankshaft usually horizontally in a plating bath and depositing on the bearing surfaces several thousands of chromium, thereafter grinding the surfaces to the desired size and, of course, to accurate dimensions.

Our invention is particularly useful for this purpose in that we concentrate the depositing action at the journal or bearing surfaces, and by effecting a relative rotating motion between the electrodes and the bearing surfaces I am enabled to evenly distribute and concentrate the plating deposit on the desired areas, thus eliminating much if not all of the subsequent grinding.

The apparatus preferably consists essentially of means for mounting the crankshaft so that its journal bearing surfaces are properly spaced from the positive electrode surfaces. These anodes are so mounted that relative rotation may be effected maintaining the uniform spacing between the anode elements and the journal surfaces, at all of the bearings of the crankshaft, that is, the main journals as well as the rod journals throughout the plate depositing operation.

A particular object of the invention includes a means for effecting such rotation while suspending the crank vertically in a suitable tank and supplying uniform current to anodes which are adjacent to each and all of the journal surfaces, while connecting the crankshaft to the negative side of the current supply.

Our apparatus may be constructed in various ways, two illustrative forms of which are illustrated in the accompanying drawings as adapted for plating crankshaft bearings, and specific objects include the means for maintaining equal spacing between all of the electrodes and their adjacent bearing surfaces during the relative rotating throughout the plating operation.

Further specific objects include so constructing such a mechanism that it may be cheaply manufactured, efficient and durable in use, and capable of convenient operation in the positioning of the crankshaft and the removal from the apparatus after the plating operation.

The structure shown has proven effective in operation, but various modifications may be made while using the essential characteristics of the invention and within the scope of the appended claims.

In the drawings, Fig. 1 is a somewhat diagrammatic view showing a tank for the plating bath and our apparatus supporting a crankshaft, with anodes arranged to deposit on both the main bearings and rod bearings, some of the electrodes being omitted for clearness of illustration;

Figure 1:
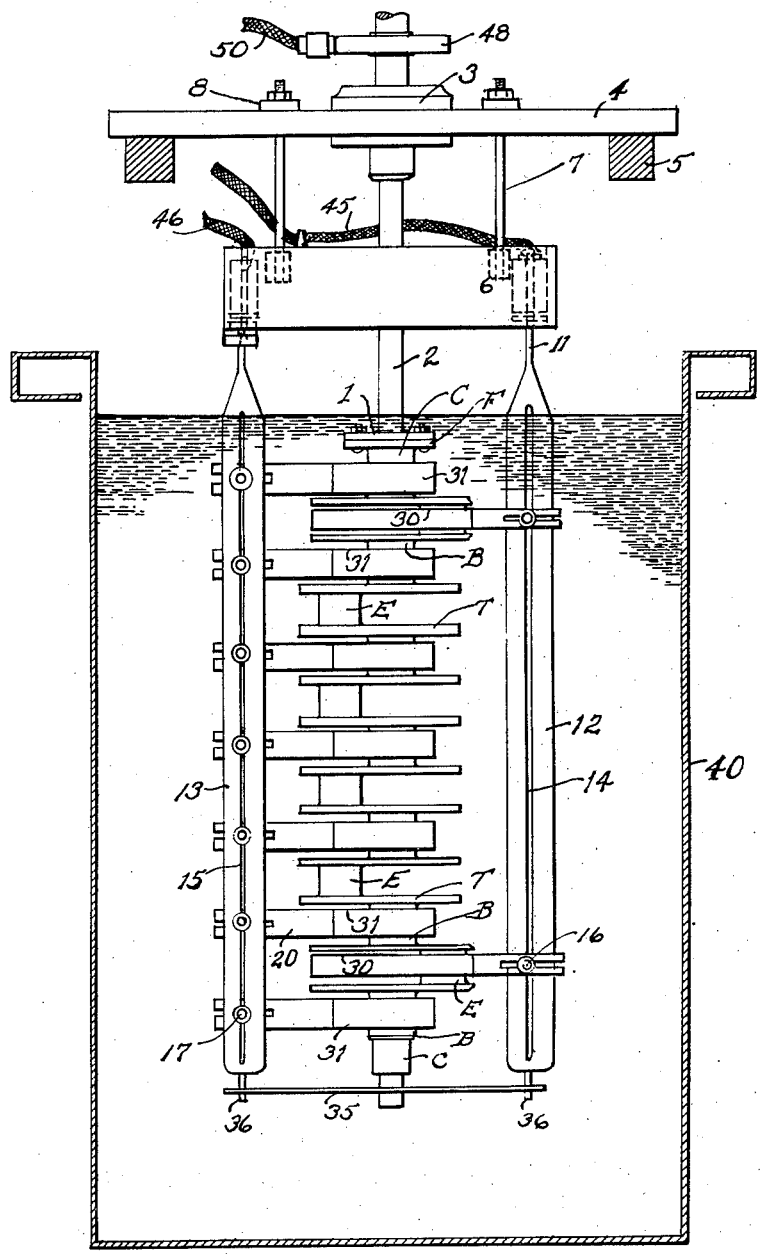

Referring to the drawings by using reference characters, the same or like parts being indicated by the same characters, a multiple throw crankshaft designated C has main bearings B, eccentric or connecting rod bearings E, and crank or throw portions as indicated at T. The usual flange F at one end of the crankshaft may be suitably attached to a similar flange 1 of a vertical shaft 2, shown as rotatably supported in a bearing indicated at 3. The bearing is shown as carried by a horizontal frame comprising cross members 4 and 5.

Suspended from the frame members 4 is a framework for carrying the spaced electrode members. As shown, a ring 6 is supported by a plurality, preferably four, supporting rods 7 projecting through the frame and held by suitable nuts 8. Within the ring member 7 we provide bearings 10 for receiving spindle-like extensions 11 of the anode-carrying current conducting members 12 and 13 of lead. These are shown as long flat strips having longitudinal bolt-receiving slots 14 and 15, respectively, for receiving the bolts 16 and 17 which pass through slots 18 and 19 in flat bar-like shank portions 20 and 21 of the anode members. Thus, the anodes may be clamped in adjusted vertical positions.

Figure 2:
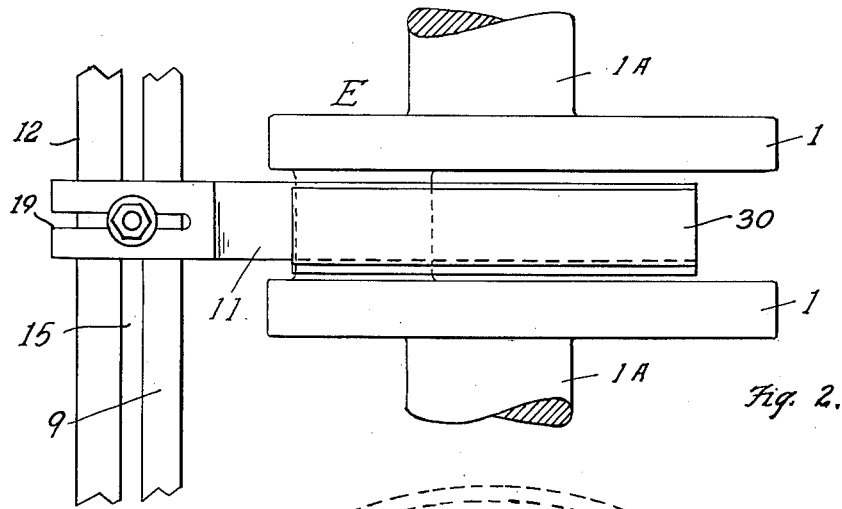
Fig. 2 is an enlarged detail elevation of the anode assembly for the crank connecting rod bearing.
Figure 3:
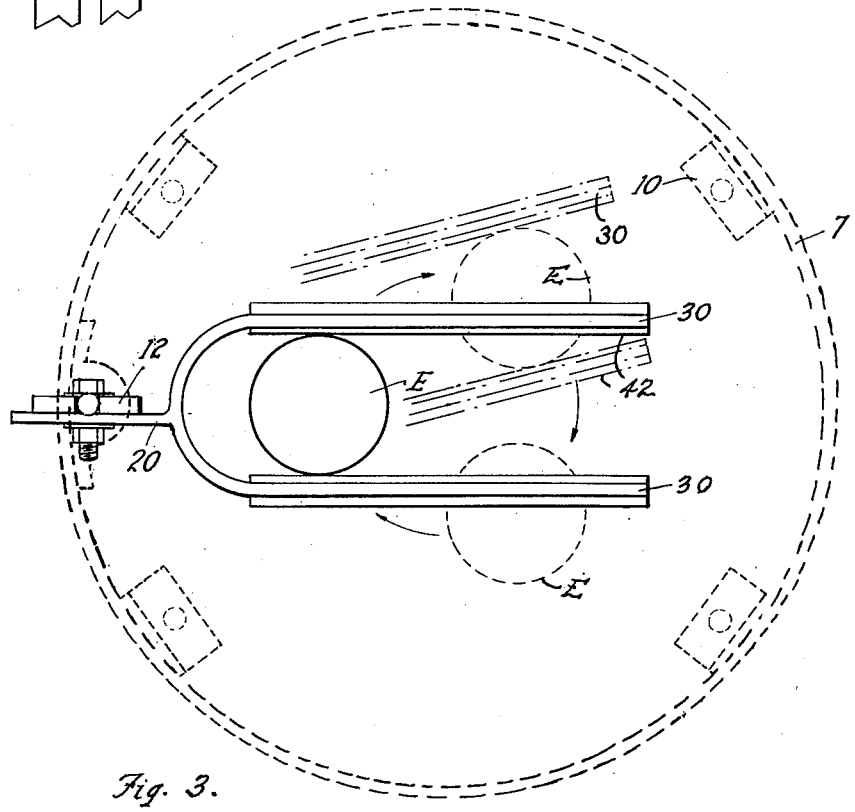
Fig. 3 is a horizontal section through one of the connecting rod bearings, showing the anode mounting, this view being taken on the same scale as that of Fig. 2.
Figure 4:
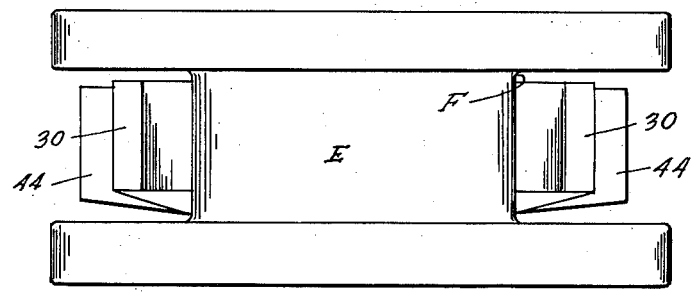
Fig. 4 is a further enlarged elevation of a single rod bearing, and showing the parallel anode arms and positioning means in elevation.
Figure 5:
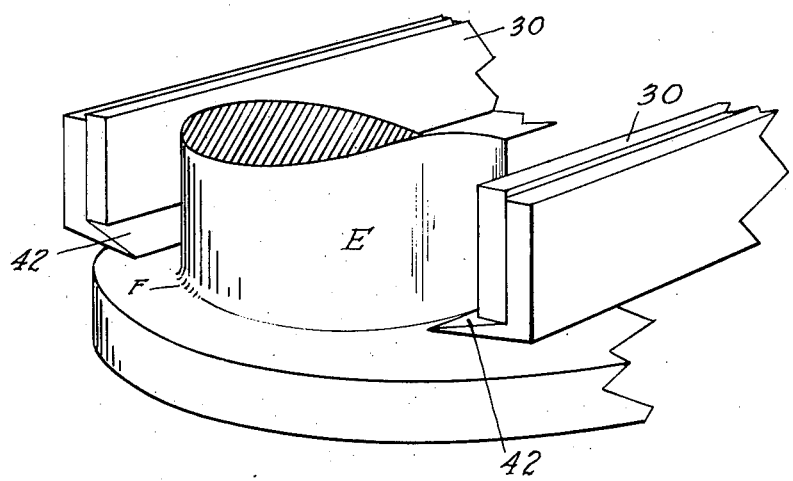
Fig. 5 is a fragmentary perspective view of these same parts.
Figure 6:
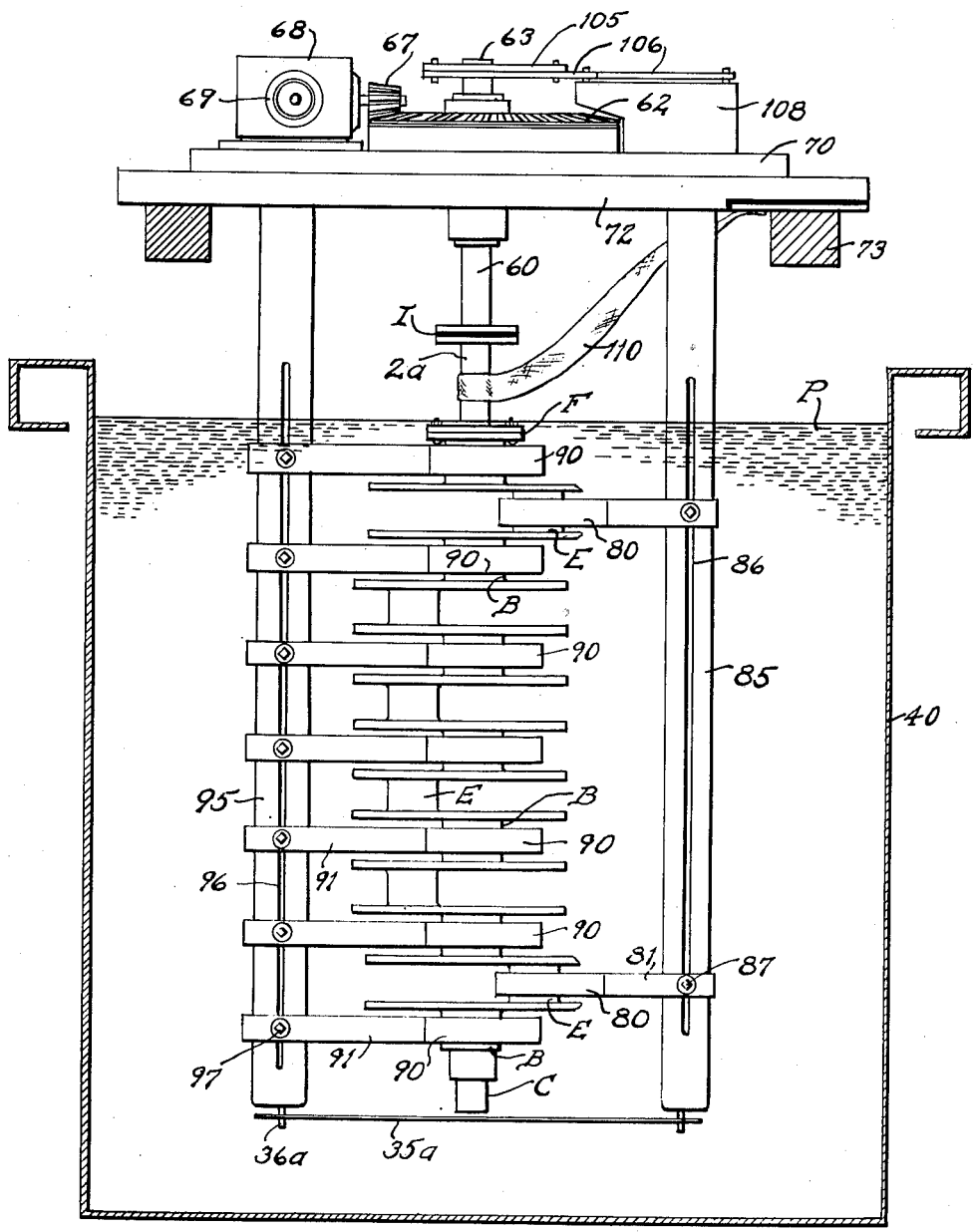
Fig. 6 is a view similar to Fig. 1, showing a modified form of anodes and a crankshaft mounting and means for moving the crankshaft so that its main and throw-bearings all travel in small circular orbits.
Figure 9:
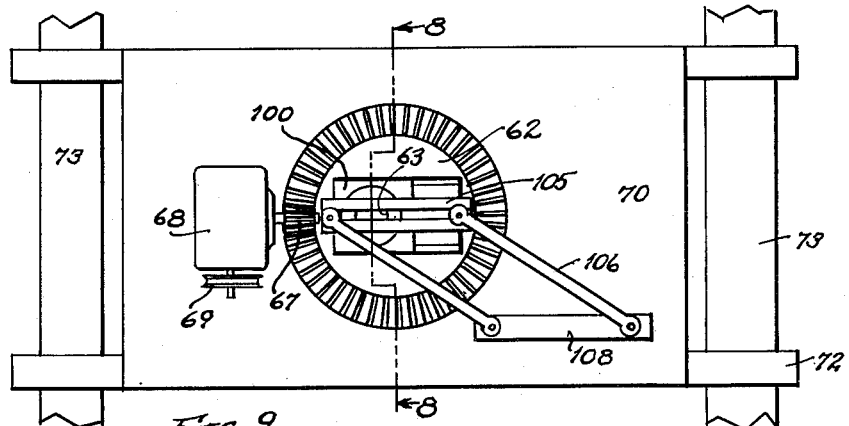
Fig. 9 is an enlarged detail showing the arrangement of ring-like anode elements surrounding each bearing with both the main bearings and throw or crank bearings being eccentrically positioned with relation to the annular anodes.
Figure 8:
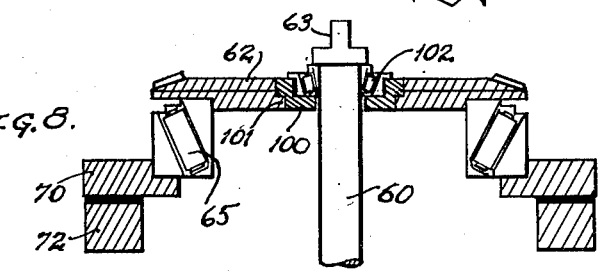
Fig. 8 is a somewhat enlarged sectional view taken substantially on the line 8—8 of Fig. 7.
Figure 7:
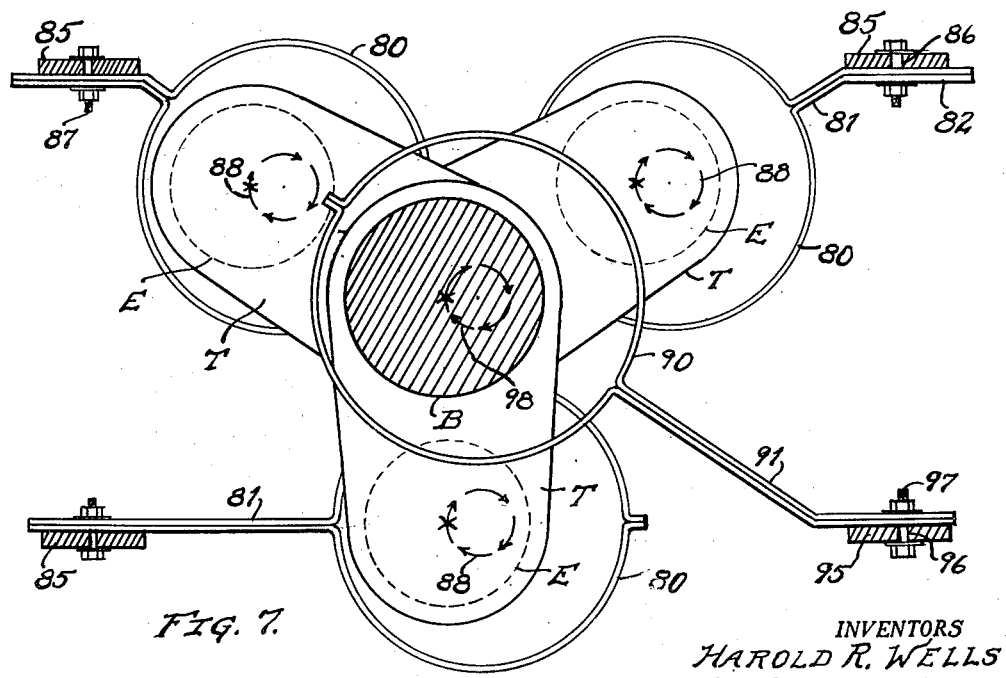
Fig. 7 is a plan view of the means for thus bodily revolving but not rotating or turning the crankshaft.

Referring to Figs. 2 and 3, the anode there shown comprises a pair of parallel arms 30 joined to the shank 20 and spaced from the crank throw-bearing E, as appears in Fig. 3.

The shanks 21 and the electrode members 31 are of like construction with pairs of anode members or arms standing equally spaced from the main bearings B.

A non-conducting bracing plate or frame member 35 may be holes rotatably receiving small trunnions or projections 36 on the anode carrying legs 12 and 13, and if desired this plate 35 may have an opening receiving the end of the crankshaft to steady the same while permitting its rotation.

The trunnions 36 engaging this non-conducting plate or frame member 35 may steady lower ends of the legs 12 and 13 while permitting them to oscillate.

The shaft is intended to rotate within the plating bath P in a suitable tank 40, and in the construction shown the spacing of the anode from the surfaces of the throw-bearings E may be effected in a suitable manner such as oscillating the supporting members 12 in a timed relation such as to follow the orbit of the bearing 30 around the axis of the main bearings and the supporting shaft 2.

A pair of knife-like guide edges 42 follow the bearing without interfering with the deposit of the plating material, i. e., the chromium thereon, and may be formed of a non-conducting material, such as methyl-methacrylate or like non-conducting plastic. As shown, the knife edges are formed integral with longitudinal strips 44 which may extend along and be secured to the anode arms 30, while the supporting carrier leg 12 may oscillate freely on the spindle 11, and the trunnion 36.

The positive side of the plating circuit may be conducted to the anodes through suitable cables 45 and 46, bringing the positive current to the spindles as at 11, and thus through the supporting legs 12 and 13 to the anodes. Suitable contact is made with the shaft 2 to carry the negative current from the shaft. As shown, a collector ring 48 is carried on the shaft 2, and a cable 50 leads from the brush contacting this ring.

In using the invention thus far described, the plating bath carrying the chromium-oxide in solution having been provided in a tank, the shaft to be plated having been immersed and supported therein, as described, and the anodes having been adjusted along the legs 12 and 13, the shaft 2 and its supported crankshaft are then rotated while current is supplied through the anodes, the bath and to the shaft bearings as cathode elements.

The preparation of the crankshaft for such plating treatment may preferably include coating the surfaces not desired to be plated, that is, all surfaces except the bearing, with a non-conducting coating which may be applied by spraying or other suitable means.

By reason of the uniform spacing of the anode surfaces from the cathode surfaces, namely, the bearing surfaces, and the width of the anode arms being only slightly less than the width or length of the bearings, the chromium deposit is uniform. The deposited plating material will be of even thickness around and for the length of the bearing and extend onto the end fillets F.

Another effective method and means for carrying out our invention involves bodily moving the crankshaft so that the main axis and the axes of the journal surfaces travel in small circular orbits within annular anodes having cylindrical surfaces, the axes of the anodes being coincident with the orbits of the journals. That is, the crankshaft is vertically suspended in the plating bath, and its main axis is caused to move in a small circular path while around each of the journal bearing surfaces and eccentric thereto are mounted stationary cylindrical anodes which are concentric with the axis of the orbital movement of each journal.

A means for so suspending and moving the crankshaft and the arrangement of such cylindrical anodes may be of any suitable construction, but we have found that the arrangement illustrated in Figs. 6 to 9 is simple and effective.

Referring to these figures, the crankshaft C is suspended vertically by its flange F on a shaft section 2a, which, in turn, is carried by the shaft 60, there being intermediate flanges separated by insulation I. The shaft 60 extends through a circular rotating gear disk 62 and is supported thereby as will presently appear. The upper end of the shaft 60 is provided with a flattened tongue-portion 63 by means of which rotation of the shaft 60, and thus the supported crankshaft, may be prevented while its axis may revolve in an orbit about the center of the disk 62.

The disk 62 may be provided with suitable gear teeth for coacting with the bevel gear pinion 67 which, in turn, is rotated by suitable transmission gearing, the casing for which is indicated at 68 and which is driven in any suitable means as by a pulley 69.

The gear disk 62 is shown as caried on suitable thrust roller bearing indicated at 65 mounted in a plate or like support 70, in turn carried on supporting members 72 mounted on any suitable frame support such as indicated at 73.

Preferably, the entire assemblage of gearing, frame, the crankshaft and anodes is arranged to be raised and lowered with relation to the tank 40.

Depending from the member 72 are anode supporting bus bars 85 and 95, each having bolt-receiving slots 86 and 96, respectively, providing for adjusting the anodes. The anodes 80 for the throw journal surfaces are shown as circular and as being formed of semi-circular bands joined at 81 and extended to the bus bar 85. The anodes 90 are similarly constructed, having arms 91 shaped to extend to the bus bar 95 and be positioned and supported thereby.

The movement of the crankshaft, with its main and connecting rod journals surrounded by the annular anodes 80 and 90, is such that the axis of the journals move in the orbits indicated by the arrow circles 88 and 98 within and concentric with the stationary anodes. The width or height of the anode bands is such that they are coextensive with the major portion of the vertical cylindrical surfaces of the journals. The clearance at the top and bottom edges of the annular anodes from the crank arms T and the fillets at the ends of the journal surfaces is such that the spacing from the nearest part of each journal surface to the anode at any one part of the orbit will remain uniform as the crankshaft bodily moves.

This movement brings all parts of each surface to be plated to a predetermined nearness to the anode surface, progressively and continuously effecting the desired uniform deposit. In this connection it may again be noted that the paths of movement, that is the orbits, of the journals are concentric with the surfaces of the stationary cylindrical anodes.

The distance at the nearest point from the journal surface to the anode surface may be determined by adjusting a block 100 along slideways 101 in the gear disk 62 and through which the shaft 60 projects. The block 100 may be fitted with a suitable roller thrust bearing 102 supporting the shaft member 60.

To prevent rotation of the shaft 60 and thus maintain the orbital movement, as described, the flat sides of the tongue 63 are slidably fitted between parallel guides 105, the ends of which are pivoted to parallel arms 106, in turn pivoted to the member 108 rigid with the plate 70. Thus, as the disk 62 revolves the supporting plate 100 and its bearing 102 carrying the shaft 60 and the crankshaft in a position eccentric to the gear disk, the shaft 60 and the crankshaft are moved in an orbit, but the crankshaft with its crank arms is held against rotation while thus traveling bodily in this circular orbit.

For different sizes of cranks, the anodes, of course, may be positioned as desired along the bus-bars and be clamped by any suitable means such as bolts 87 and 97. Likewise, it will be seen that any number of journals may be plated from a single main or connecting rod journal to all of the journals of a crankshaft for a multiple cylinder engine.

Inasmuch as the shaft 60 does not rotate (but moves in a small orbit) current, it may be led from section 2a below the insulation by a flexible lead 110 suitably soldered or otherwise fixed to the shaft section 2a. Similarly current may be brought to the bus bars 85 and 95.

In the case of treating a selected single journal, or any number or less than all of them, the anodes for the journals not to be treated are merely omitted while the journal surfaces not to be treated are suitably coated to prevent the stray deposit.

From the foregoing description it will be seen that we have provided a method and means by which we may deposit chromium or other plating metal on journal surfaces of new crankshafts to a predetermined thickness, and thus to a finished size. In this manner we may produce a surface that has proven to give two or three times longer wear-life than that of any other bearing surface now provided. The plating may be so accurately deposited to the desired size that no grinding is necesary and this results in a surface hardness free from grinding marks or roughness.

Likewise, we may reduce the amount of subsequent grinding and attain and preserve a finer grain construction of the bearing surfaces. We are enabled to effect this uniform deposit of predetermined thickness on single surfaces or on selected numbers of journal surfaces, thus building up and reconditioning badly worn crankshafts.

From the foregoing description it will be seen that we are enabled to accomplish the various objects herein set forth, and other advantages will be apparent to those familiar with the requirements of plating crankshaft journal bearing surfaces and of plating articles of various other shapes but which may involve analogous problems.

Having thus described our invention what we claim is:

1. An apparatus for electro-plating of crank throw connecting-rod-journals of a crankshaft, comprising a container for a plating bath, means for suspending the crankshaft vertically in the bath in the container, means for rotating the crankshaft on a vertical axis when so suspended causing its throw journals to revolve in circular paths, a vertically extending bus-bar parallel to the crankshaft, a pivotal supporting means for the bus-bar, an anode fixed to the bus-bar and having a flat surface parallel with the vertical axis and with the side of a journal surface and extending vertically along the same and spaced therefrom, a non-conducting element extending along and fixed upon each anode arm and having a straight knife edge portion projecting from the anode and positioned to contact the journal surface being plated, said edge being parallel to the anode arm, and the length of the anode surface being sufficient to follow the circular path of the journal surface and maintain its adjacent plating relationship.

2. The apparatus described in claim 1 in which the anode comprises a pair of relatively fixed elongated flat parallel anode arms, and a strip of non-conducting material fixed upon each anode arm said strips forming insulating spacing members having straight parallel knife edges contacting the revolving surface of the journal bearing for causing the oscillation of the anode surfaces while maintaining their spacing from the journal surface.

3. An apparatus for electro-plating of crankshafts having a plurality of aligned main bearings and having a plurality of sets of aligned connecting-rod-journal bearings, the apparatus comprising a container for a plating bath, means for suspending the crankshaft in the bath, and means for rotating the crankshaft on a vertical axis in the bath, an anode mounted adjacent to each main bearing, and supporting means for said anodes including adjustable clamping means for positioning the anodes according to the spacing of the main bearings and including a vertically extending rigid member connected to said suspending means, a plurality of sets of anodes, each set including an anode positioned adjacent to one of the aligned sets of connecting-rod-journal bearings, rigid vertically extending supporting members pivotally carried by said suspending means, each of said supporting members carrying one of said sets of anodes each of the latter anodes comprising a pair of straight parallel arms spaced apart and extending adjacent to its bearing surface, and means for causing the aligned anodes to oscillate to follow the path of revolution of aligned journal bearings, said means comprising non-conducting members each extending along and fixed to an anode arm and having straight edges parallel with the anodes and extending inwardly from the anode arms and adapted to engage a journal bearing surface to oscillate the connected supporting member, and means for carrying current to all of said anodes.

References Cited in the file of this patent

UNITED STATES PATENTS

| | | |
|---|---|---|
| 827,478 | Totten | July 31, 1906 |
| 2,457,510 | Van Ornum | Dec. 28, 1948 |
| 2,473,290 | Millard | June 14, 1949 |
| 2,530,677 | Berkenkotter | Nov. 21, 1950 |
| 2,539,502 | Zanetti | Jan. 30, 1951 |